United States Patent
Sans I Ravellat et al.

(10) Patent No.: US 6,201,210 B1
(45) Date of Patent: Mar. 13, 2001

(54) LASER MARKING APPARATUS WITH DIODE LASER MATRIX

(75) Inventors: Ramon Sans I Ravellat; José Miguel Ibanez Baron, both of Barcelona; Jordi Beringues I Algue, Girona, all of (ES)

(73) Assignee: MACSA ID S.A., Manresa (ES)

(*) Notice: Subject to any disclaimer, the term of this patent is extended or adjusted under 35 U.S.C. 154(b) by 0 days.

(21) Appl. No.: 09/268,986

(22) Filed: Mar. 16, 1999

(30) Foreign Application Priority Data

Mar. 17, 1998 (ES) .................................................... 9800582

(51) Int. Cl.[7] .................................................. B23K 26/00
(52) U.S. Cl. ................................ 219/121.61; 219/121.68; 219/121.76
(58) Field of Search ..................... 219/121.68, 121.76, 219/121.73, 121.75, 121.61

(56) References Cited

U.S. PATENT DOCUMENTS

| | | | |
|---|---|---|---|
| 4,024,545 | 5/1977 | Dowling et al. | 346/76 L |
| 4,652,722 | * 3/1987 | Stone et al. | 219/121.76 |
| 4,743,091 | * 5/1988 | Gelbart | 369/112 |
| 4,804,975 | * 2/1989 | Yip | 347/237 |
| 5,130,721 | * 7/1992 | Sukhman | 219/121.68 X |
| 5,463,200 | * 10/1995 | James et al. | 219/121.68 |
| 5,513,195 | 4/1996 | Opower et al. | 372/18 |

FOREIGN PATENT DOCUMENTS

| | | |
|---|---|---|
| 4234342 | * 4/1994 | (DE) . |
| 0 060 641 | 9/1982 | (EP) . |
| 0060641 | * 9/1982 | (EP) . |
| 0 157 546 | 10/1985 | (EP) . |
| 0 538 044 | 4/1993 | (EP) . |
| 0 661 786 | 7/1995 | (EP) . |
| 2133352 | * 7/1984 | (GB) . |
| 60-145889 | * 8/1985 | (JP) . |
| 2-142695 | * 5/1990 | (JP) . |
| 90/00294 | * 1/1990 | (WO) . |
| WO92/08313 | 5/1992 | (WO) . |
| WO97/40957 | 11/1997 | (WO) . |

* cited by examiner

Primary Examiner—Samuel M. Heinrich
(74) Attorney, Agent, or Firm—Darby & Darby

(57) ABSTRACT

A laser marking system includes a means for generating a laser beam and a marking control unit which generates individual signals applied to a laser system for producing an N×M matrix of dots used to mark an object. Each dot is created from the laser light from at least one laser diode. If multiple lasers are used, their power can be combined with a concentrator to produce a single beam with a higher power and also provide for simplified control over the beam's power.

16 Claims, 2 Drawing Sheets

LASER MARKING APPARATUS WITH DIODE LASER MATRIX

TECHNICAL FIELD OF THE INVENTION

The present invention relates to the technical field of systems for marking the surface of articles. More specifically, the invention concerns the sector of marking of surfaces of articles, including moving articles, using laser beams.

It is the main object of the invention considerably to reduce the volume and price of the marking system.

BACKGROUND TO THE INVENTION

In the state of the art, it is known to use systems for marking moving objects, for example from Spanish patents n° 8901979 and n° 9602373 which describe a marking system using a laser which comprises a source of laser emission such as a $CO_2$ laser of which the bean impinges on an acousto-optical deflector to which various frequency values are applied by means of a constant gain radiofrequency amplifier, to produce different angles of deflection of the laser beam impinging on the deflector, marking the character, logo, text, etc. This information to be printed is introduced into a data acquisition unit which generates a digitised N×M matrix of dots corresponding to the impression to be made and is saved in a memory.

The deflected beams are applied to the surface to be marked by means of optical focusing means of which the function is to focus the deflected laser beam on to the surface to be marked.

Although this type of system operates perfectly, it has the drawback that the $CO_2$ laser tube has very large dimensions so it is difficult to site it in production lines.

A further drawback is that $CO_2$ laser tubes are very expensive.

It should also be mentioned that this type of system has the drawback that it is necessary to include an acousto-optical deflector which, apart from its cost, does not have a very high power output owing to the losses by absorption and the low efficiency of deflection, due to the fact that it loses laser power by the mere fact of passing through the crystal of the deflector and, furthermore, a proportion of the resultant power cannot be deflected owing to the intrinsic limitations of acousto-optical deflection.

On the other hand, laser diodes are known of which a basic characteristic is that, from a very small size, they are capable of generating a laser beam with a considerable power level and with very low energy consumption.

At present, there is no marking system which employs laser diodes to produce the marking according to a N×M matrix of dots, which would be a system with a smaller volume and lower costs.

DESCRIPTION OF THE INVENTION

To overcome the above-mentioned drawbacks and deficiencies, the invention has developed a new laser beam marking system using a marking system comprising, like conventional systems:
  means for generating a laser beam;
  optical means for focusing the laser beam on the surface to be marked;
  a marking control unit for generating distinct signals which are applied to the means for generating a laser beam and to the optical focusing means to produce the marking according to a N×M matrix of dots;
  a character generator included in the actual marking control unit and with the feature that it is characterised in that the means for generating the laser beam are formed by at least one laser diode for each dot N of the matrix, N being the vertical dots or raster dots or for at least one laser diode for each of the N×M dots of the marking matrix, M being the number of dots of the width of the matrix.

This arrangement avoids the use of $CO_2$ laser tubes which are very large in size and are expensive and, on the contrary, employs a plurality of laser sources formed by laser diodes which, on the other hand, are much more economical, have very small dimensions and have an adequate power level to produce the marking and with very low energy consumption.

Furthermore, this arrangement avoids the use of acousto-optical deflector, resulting in a much better energy yield since there are no losses by absorption since the various beams produced are not deflected as they are applied directly to the surface to be marked.

In a preferred embodiment of the invention, the means for generating the laser can be formed by an array of laser diodes with a combiner, for each dot of the matrix, so that the beams generated by each array of laser diodes impinge in phase on the combiner which adds them (greater power) and projects the resultant beam onto the optical focusing means. According to this preferred embodiment, the marking control unit can be equipped with:
  means for activating at least one diode of each array of laser diodes for the duration of marking the dot allocated thereto; and/or
  means for activating all the diodes of each array of laser diodes for the period of marking the dot allocated thereto; and/or
  means for independently activating the individual laser diodes making up the array corresponding to a dot and/or
  means for simultaneously activating the various arrays of laser diodes for the dot marking period, a vertical line of dots or a complete character being marked during this period; and/or
  means for sequentially activating the various arrays of laser diodes in order to mark a vertical line of dots.

As known, each surface to be marked requires different energy to permit the volatility of said surface, so the marking unit modulates the dot energy in order to adapt itself to the energy requirements of the product to be marked by the selective activation of a plurality of or all diodes of the array and/or by modulating the dot duration, that is by keeping the number of diodes activated during the period required to permit marking, and/or by controlling the exciting current of each diode or array of diodes.

The system according to the invention can also comprise an optical system for correcting each of the beams generated, for which it uses an optical system for each laser beam in order to configure the laser beam by giving it the characteristics required to enable the focusing lens subsequently to generate a focal point with the maximum roundness and the minimum possible diameter. Each optical system basically consists of a beam magnifying telescope and also of a cylindrical lens in some cases.

In an embodiment of the invention, the focusing system consists of an array of microlenses, that is a small lens for each marking dot. This array of focusing microlenses together with the laser-generating diodes and the correcting optical system can be integrated within the marking pad.

According to the invention, the laser beams are directed from the diodes to the focusing system by optical fibre lines, one optical fibre line, for example, being used for each diode or for each array of diodes so as to eliminate conventional beam directing optical elements and thus avoid the problems and difficulties associated therewith such as the corresponding adjustment and alignment.

In a further embodiment of the invention, the focusing means are conventional and comprise a mechanical system designed for fastening the laser diodes or the outputs of the optical fibre so as to form a certain angle between said fibres or laser diodes and to enable the individual laser beams to be kept separate after focusing.

If the focusing means consist of a network of microlenses to allow variation of the marking height, they include means for vertically displacing all the laser diodes or optical fibres discretely until their position coincides with the contiguous focusing microelement. Therefore, to allow variation of the marking height, it is essential also to change the position of each focusing microlens.

On the other hand, if the optical focusing means are formed by conventional means in which the laser diode or optical fibre are disposed at an angle to one another, it is sufficient to enlarge or reduce the lighting angle of each laser diode or optical fibre end with respect to the focusing lens.

It is also possible for the focusing means to be formed by the arrangement of a small conventional lens for each laser beam, in which case the marking height is controlled by displacing all the laser diodes or optical fibres together with their corresponding lenses. The combination of these last focusing means together with the means for controlling the marking height is less advantageous than those mentioned hereinbefore.

The diodes are preferably structured with predefined geometry which allows all laser beams to issue in parallel.

In addition to the above-mentioned advantages, the system according to the invention also requires a much smaller system for refrigerating the laser diodes than that used in the $CO_2$ laser since the energy output of the laser diodes is much higher.

To facilitate understanding of this specification and as an integral part thereof, the accompanying drawings show an illustrative non-limiting embodiment of the subject of the invention.

EMBODIMENTS OF THE INVENTION

The invention will be described hereinafter with reference to the above-mentioned drawings.

Figure 1:
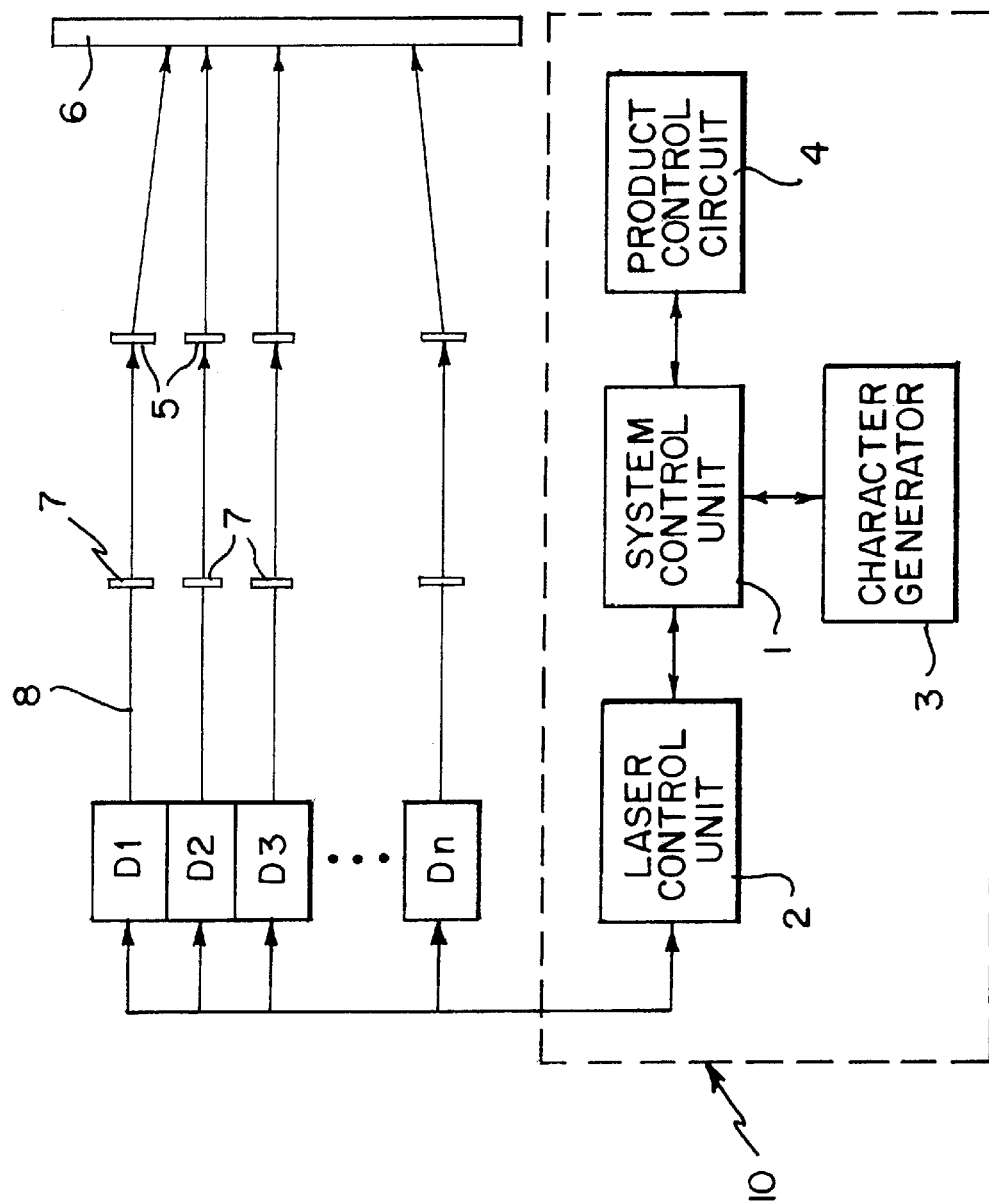
FIG. 1.—is a functional block diagram of a possible embodiment of the invention in which a laser diode is used for each of the dots N or a laser diode for each of the dots N×M of the matrix.

FIG. 1 shows a first embodiment of the invention consisting of a system control unit 1 which is combined with a laser control unit 2, a character generator 3 and a product control circuit 4. All the described units form the marking control unit 10 which generates the individual signals for effecting the marking of the various characters according to a matrix of dots N×M as will be described hereinafter.

The laser control unit 2 is connected to at least one diode D1, D2, . . . Dn for each of the vertical dots or raster dots N of the matrix.

The laser beam produced by each diode D impinges on an optical system 7 which configures the laser beam and basically consists of a beam-magnifying telescope and, in some cases, also of a cylindrical lens, if necessary.

The laser beam then impinges on a microlens 5 which constitutes the means for focusing the laser beam on the surface to be marked 6.

According to one embodiment of the invention, the laser beams can be directed from the diodes to the focusing system by optical fibre lines 8. For example, one fibre can be used for each diode or for each array of diodes. This eliminates the need to provide conventional optical beam directing elements and thus avoids the associated problems and difficulties, such as adjustment and alignment of the laser beams relative to the beam directing elements.

The control unit for the product 4 determines the velocity of the product in the marking station and at the same time detects when the product to be marked is located opposite the microlenses 5.

The system control unit 1 is therefore able to adequate the signals on the basis of the velocity and the moment of time when the surface to be marked 6 is located opposite the microlenses 5.

Furthermore, the generation of the various signals is dependent on the information supplied by the character generator 3 since the various signals are generated according to the character to be marked.

With all this information, the system control unit 1 controls operation of the laser control unit which activates and deactivates the various diodes D as a function of the character to be marked.

In an embodiment of the invention, therefore, the laser control unit, on the basis of the information supplied by the system control unit 1, simultaneously activates the diodes D1 corresponding to the various dots to be marked in each raster so that, during the dot marking period, a raster of the character is marked and this considerably reduces the marking time or, if the same marking time as in a system with a single laser is desired, greater dot energy is obtained (N times).

Similarly, the laser control unit 2 can be connected to at least one diode D for each of the N×M dots of the matrix to be marked so that, during the dot period, it is possible to mark an entire character. This marking structure is even faster than the previous one, or higher dot energy is obtained (N×M times more) than in a system with a single laser.

It is obviously also possible sequentially to activate the various diodes D in either of the two aforementioned cases, so marking of the various dots is carried out one after the other, in which case the marking operation takes longer as a function of the number of dots to be marked.

Figure 2:
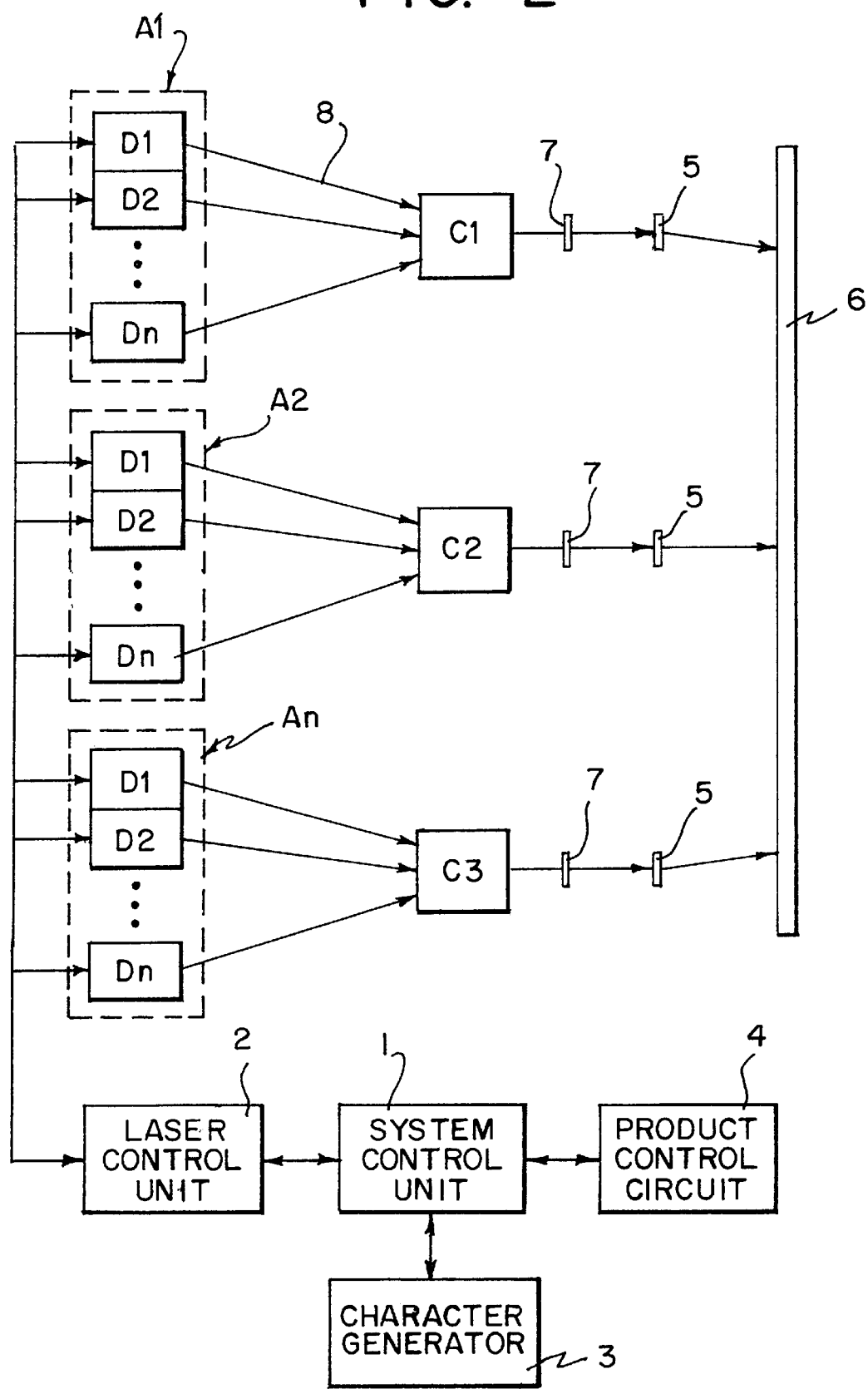
FIG. 2.—is a functional block diagram of another possible embodiment in which an array of laser diodes is used for each of the dots N to be marked or an array of diodes is used for each of the dots N x M of the matrix to be marked.

FIG. 2 shows a further embodiment of the invention in which there is also used a system control unit 1 connected to a laser control unit 2, a character generator 3 and a product control circuit 4, which operates in the above-described manner.

In this embodiment, the difference resides in the fact that an array of diodes A1, A2, . . . An is used for each of the dots N forming a vertical raster of the character to be marked or for each dot of the N×M dots of the complete character to be marked.

In this embodiment, each of the arrays A is related to a combiner or adder C1, C2, . . . Cn so that the beams generated by each of the diodes D1, D2, . . . Dn of each of the arrays A impinge in phase on the combiner C which adds them and projects the resultant beam onto the optical focusing means which, in the embodiment, are formed by a microlens 5.

For marking a character, however, operation is similar to that of the embodiment described with reference to FIG. 1, but with the difference that the laser control unit activates at least one diode of each array of laser diodes for the period of marking the dot allocated to it. With this embodiment, it is obviously possible to activate all the diodes D of each array A for the period of marking the dot allocated to it and also simultaneously to activate the various arrays of laser diodes during the dot marking period, a vertical line of dots N being marked during this period.

It is also possible to arrange an array of diodes A1 for each of the N×M dots of the matrix to be marked, in which case the various arrays of laser diodes can be activated simultaneously during the dot marking period, a complete character being marked during this period.

It is also possible sequentially to activate the various arrays A of laser diodes, in which case marking is carried out over a longer period proportional to the number of dots to be marked.

It is obviously possible independently to activate the various laser diodes making up the array A of diodes corresponding to a dot.

The marking energy can be controlled in the embodiments shown both in FIG. 1 and in FIG. 2, for which purpose the marking energy is controlled by controlling the activation period of each of the diodes D1, D2, . . . Dn in the example shown in FIG. 1. The same control can be achieved in the example shown in FIG. 2, in which the energy can also be controlled by selective activation of various diodes of the array A, that is by activating the necessary number of diodes of the array, since the power of the resultant beam issuing from the combiner C depends on the number of laser diodes activated at the same moment within each array A. Another method of controlling marking is by controlling the exciting current of each diode or array of diodes.

Figure 3:
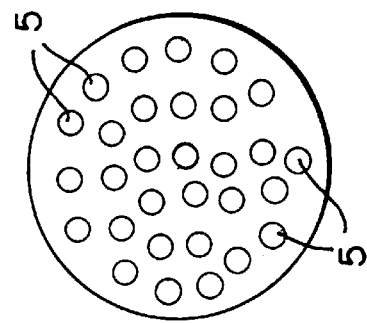
FIG. 3.—is a front view of another possible embodiment of an array of microlenses.

FIG. 3 shows an embodiment of a microlens structure in which as many laser diodes or arrays of diodes are used as N×M dots of the matrix.

This example shows a conventional microlens structure and it will be necessary to select the microlenses required to make up a matrix N×M. A microlens structure having the configuration N×M will advantageously be used in one embodiment, all the microlenses of the structure therefore being used.

Focusing can also be carried out by the methods described in the section entitled description of the invention.

On the basis of the description, it will be appreciated that the laser diodes can only operate in a pulsed manner, as described in patent application P-9800165.

What is claimed is:

1. A laser marking system for marking a surface of an object, comprising:
    a plurality of laser diodes;
    a plurality of combiners, each combiner receiving laser light from a respective array of at least two laser diodes and producing a combined laser beam as output, the laser diodes associated with each particular combiner producing laser light which impinges the particular combiner in phase;
    an optical system receiving the laser beams and focusing the laser beams on the surface to be marked;
    a marking control unit comprising a character generator and producing control signals which are applied to the plurality of laser diodes to thereby produce a controllable N×M matrix of laser beam dots, each dot in the matrix formed by the laser beam from at least one laser diode;
    wherein selective illumination of the dots in the matrix in response to the control signals from the marking control unit produces a predetermined marking on the surface to be marked.

2. The system of claim 1, wherein the marking control unit activates each laser diode associated with a particular dot for a marking period.

3. The system of claim 2, wherein the marking control unit illuminates a plurality of dots simultaneously during the dot marking period.

4. The system of claim 1, wherein the marking control unit illuminates each dot in the matrix sequentially.

5. The system of claim 1, wherein the marking control unit produces output signals which are applied to the optical system to adjust focus of the laser beams.

6. The system of claim 1, wherein the marking control unit is configured to activate at least one laser diode in each array of laser diodes feeding a respective combiner for a marking period the dot associated with the combiner.

7. The system of claim 1, wherein the marking control unit is configured to activate all the laser diodes of each array of laser diodes for a marking period of the associated dot.

8. The system of claim 1, wherein the marking control unit comprises means for independently activating the individual laser diodes making up each array.

9. The system of claim 1, wherein the marking control unit comprises means for simultaneously activating the arrays of laser diodes for a marking period to thereby produce a vertical line of marks during this period.

10. The system of claim 1, wherein the marking control unit comprises means for sequentially activating the arrays of laser diodes to thereby produce a vertical line of marks on the surface.

11. The system of claim 1, wherein the optical system comprises array of microlenses, each microlens corresponding to a respective dot.

12. The system of claim 1, further comprising a plurality of optical fibers to direct each laser beam to the optical system.

13. The system of claim 12, further comprising a mechanical system for fastening at least one of the laser diodes and outlets of the optical fibers to form a predetermined angle therebetween.

14. The system of claim 1, wherein the optical system further comprises a beam-magnifying telescope for correcting each respective laser beam.

15. The system of claim 1, comprising means for controlling laser energy for an illuminated dot by at least one of controlling a dot illumination period, controlling a laser diode exciting current, and selective activation of the laser diodes in each array.

16. The system of claim 14, wherein the optical system further comprises a cylindrical lens operating in cooperation each beam-magnifying telescope to correct the respective beam.

* * * * *